United States Patent
Sumi et al.

(10) Patent No.: US 7,326,276 B2
(45) Date of Patent: Feb. 5, 2008

(54) METHOD OF SHUTTING OFF FUEL GAS MANUFACTURING APPARATUS

(75) Inventors: Hideaki Sumi, Utsunomiya (JP); Hiroshi Machida, Utsunomiya (JP); Satoshi Hanai, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 11/055,251

(22) Filed: Feb. 9, 2005

(65) Prior Publication Data

US 2005/0172804 A1 Aug. 11, 2005

(30) Foreign Application Priority Data

Feb. 9, 2004 (JP) ............... 2004-031661

(51) Int. Cl.
*B01D 46/46* (2006.01)
(52) U.S. Cl. ............ 95/19; 95/96; 95/141; 95/148
(58) Field of Classification Search .......... 95/1, 95/19, 96, 103, 141, 143, 148
See application file for complete search history.

(56) References Cited

U.S. PATENT DOCUMENTS 4,475,930 A * 10/1984 Asztalos .............. 95/98

2007/0017155 A1 * 1/2007 Al-Babtain ............ 48/197 R

FOREIGN PATENT DOCUMENTS

JP 2-280811 11/1990
JP 2002-020102 1/2002

OTHER PUBLICATIONS

Japanese Office Action for Application No. 2004-031661, dated Jul. 11, 2006.

* cited by examiner

*Primary Examiner*—Robert A. Hopkins
(74) *Attorney, Agent, or Firm*—Lahive & Cockfield, LLP; Anthony A. Laurentano, Esq.

(57) ABSTRACT

When a shutoff signal is entered to shut off a fuel gas manufacturing apparatus, it is determined whether a PSA mechanism is in a prescribed shutoff state or not. If the PSA mechanism is judged as not being in the prescribed shutoff state, the fuel gas manufacturing apparatus is continuously operated until the PSA mechanism is brought into the prescribed shutoff state. Then, if the PSA mechanism reaches the prescribed shutoff state, the fuel gas manufacturing apparatus is shut off.

6 Claims, 8 Drawing Sheets

METHOD OF SHUTTING OFF FUEL GAS MANUFACTURING APPARATUS

BACKGROUND OF THE INVENTION

1. Field of the Invention

The present invention relates to a method of shutting off a fuel gas manufacturing apparatus for manufacturing a hydrogen-rich fuel gas by modifying a hydrogen-containing fuel which contains hydrocarbon or alcohol.

2. Description of the Related Art

There has been employed in the art a hydrogen manufacturing apparatus (fuel gas manufacturing apparatus) for modifying a hydrocarbon fuel such as natural gas or the like or a hydrogen-containing fuel containing alcohol such as methanol or the like to produce a hydrogen-containing gas (modified gas) and supplying the hydrogen-containing gas as a fuel gas to a fuel cell or the like.

For example, Japanese Laid-Open Patent Publication No. 2002-20102 discloses a hydrogen manufacturing apparatus basically having, as shown in FIG. 8 of the accompanying drawings, a hydrogenerated desulfurizer 2 for being supplied with a fuel such as a city gas or the like from a compressor 1, a water-vapor modifier 3 for modifying a desulfurized fuel with water vapor to produce a high-concentration hydrogen-containing gas (hydrogen-rich gas), a catalytic combustor 4 disposed around the water-vapor modifier 3 for burning hydrogen with oxygen in air in the presence of a catalyst, a gas modifier 5 for converting carbon monoxide contained in the hydrogen-containing gas into carbon dioxide and hydrogen, and a PSA (Pressure Swing Adsorption) device 6 for separating high-purity hydrogen from the hydrogen-containing gas which has been modified by the gas modifier 5 according to pressure adsorption.

The PSA device 6 is connected to a hydrogen storage tank 8 for temporarily storing the high-purity hydrogen before it is supplied to a polymer electrolyte fuel cell (PEFC) 7, and an off-gas holder (off-gas tank) 9 for temporarily storing an off gas (unwanted materials) adsorbed from the high-purity hydrogen by the PSA device 6. The off-gas holder 9 supplies the off gas as a fuel for heating the water-vapor modifier 3 to the catalytic combustor 4.

The PSA device 6 has a plurality of adsorption towers each filled with an adsorbent for selectively adsorbing components other than hydrogen under high pressure and desorbing the adsorbed components under reduced pressure. Each of the adsorption towers cyclically operates in adsorption, desorption, replacement, and pressurization processes for extracting high-purity hydrogen and discharging other components as an off gas.

Depending on the time at which the hydrogen manufacturing apparatus is shut off, the towers of the PSA device 6 tend to be shut off at different operative positions. If each of the towers is not shut off at a proper operative position, then an abnormal residual pressure may possibly remain in the tower, and an off gas may remain under an abnormal pressure in an off-gas passage. Furthermore, the hydrogen-rich gas is liable to remain in the water-vapor modifier 3 and the passage extending from the water-vapor modifier 3 to the PSA device 6.

When the hydrogen manufacturing apparatus starts operating normally after it is shut off abnormally, an off gas initially discharged from the towers and an off gas in the off-gas passage tend to be excessively calorific with respect to the capacity of the catalytic combustor 4, possibly damaging the catalytic combustor 4. In addition, a hydrogen gas of low purity may be stored in the hydrogen storage tank 8.

SUMMARY OF THE INVENTION

It is a principal object of the present invention to provide a method of shutting off a fuel gas manufacturing apparatus in a manner to prevent the fuel gas manufacturing apparatus from being unduly affected by an off gas and to allow the fuel gas manufacturing apparatus to start reliably even if the fuel gas manufacturing apparatus is shut off under different conditions.

According to the present invention, there is provided a method of shutting off a fuel gas manufacturing apparatus for manufacturing a hydrogen-rich fuel gas by modifying a hydrogen-containing fuel into a modified gas, supplying the modified gas to a PSA mechanism, and removing unwanted materials from the modified gas to produce a hydrogen-rich fuel gas. The hydrogen-containing fuel refers to a fuel containing hydrogen, such as hydrocarbon, alcohol, or the like.

In the above method, it is determined whether the PSA mechanism is in a prescribed shutoff state or not when a shutoff signal is entered to shut off the fuel gas manufacturing apparatus. If the PSA mechanism is judged as not being in the prescribed shutoff state, the fuel gas manufacturing apparatus is continuously operated until the PSA mechanism is brought into the prescribed shutoff state. If the PSA mechanism reaches the prescribed shutoff state, the fuel gas manufacturing apparatus is shut off.

Alternatively, it is determined whether the fuel gas manufacturing apparatus is required to be shut off in emergency by an abnormal condition or not when the abnormal condition is detected while the fuel gas manufacturing apparatus is in operation. If the fuel gas manufacturing apparatus is judged as not being required to be shut off in emergency, the fuel gas manufacturing apparatus is continuously operated until the PSA mechanism is brought into a prescribed shutoff state. If the fuel gas manufacturing apparatus is judged as being required to be shut off in emergency, the fuel gas manufacturing apparatus is immediately shut off.

The PSA mechanism may reach the prescribed shutoff state when the pressure in any one of towers of the PSA mechanism is a substantially atmospheric pressure.

The PSA mechanism may reach the prescribed shutoff state when any one of towers of the PSA mechanism is in an operative position immediately prior to a desorption process.

According to the present invention, when a shutoff signal is entered to shut off the fuel gas manufacturing apparatus if the PSA mechanism is not in the prescribed shutoff state, the fuel gas manufacturing apparatus is continuously operated until the PSA mechanism is brought into the prescribed shutoff state. Therefore, the PSA mechanism is always controlled so as to be brought into the prescribed shutoff state. A fuel gas manufacturing apparatus can thus start reliably and quickly operating without damage to a heater due to an abrupt temperature rise thereof. Furthermore, any off-gas tank may be dispensed with or may be reduced in size, and hence the fuel gas manufacturing apparatus may easily be reduced in size.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
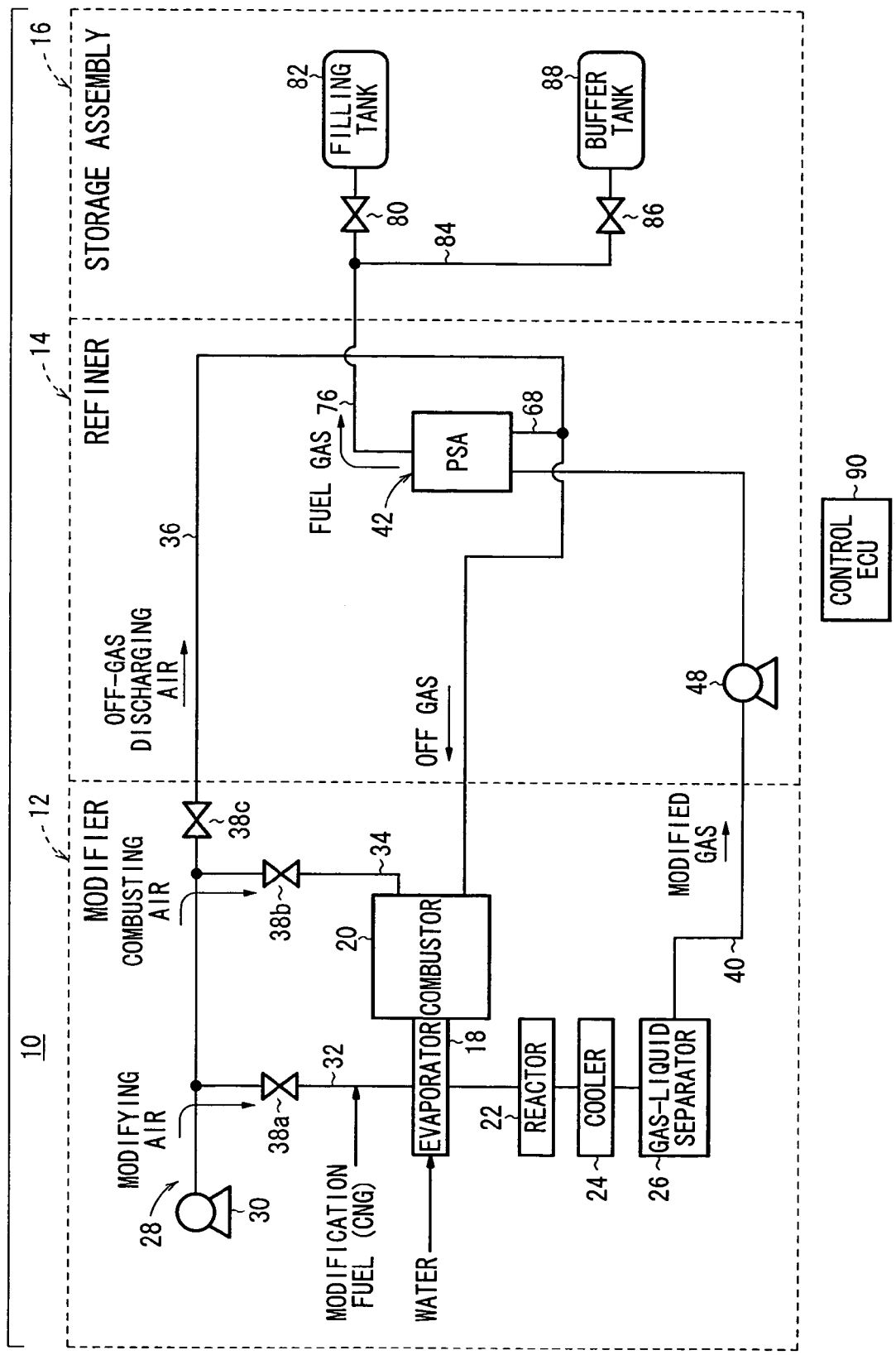
FIG. 1 is a block diagram of a home fuel gas refining system which is to be shut off by a shutoff method according to an embodiment of the present invention.

FIG. 1 shows in block form a home fuel gas refining system (a fuel gas refining system for household use) 10 as a fuel gas manufacturing apparatus which is to be shut off by a shutoff method according to an embodiment of the present invention.

As shown in FIG. 1, the home fuel gas refining system 10 has a modifier 12 for modifying a hydrogen-containing fuel, e.g., a hydrocarbon fuel such as methane, propane, or the like (hereinafter referred to as "modification fuel") to produce a hydrogen-rich gas (hereinafter referred to as "modified gas"), a refiner 14 for refining the hydrogen-rich gas into a high-purity hydrogen gas (hereinafter referred to as "fuel gas"), and a storage assembly 16 for storing the fuel gas.

The modifier 12 has an evaporator 18 for evaporating the modification fuel. The evaporator 18 is combined with a combustor (heater) 20. A reactor 22 for modifying the modification fuel into the modified gas is disposed downstream of the evaporator 18. A cooler 24 for cooling the modified gas is disposed downstream of reactor 22. A gas-liquid separator 26 for separating the cooled modified gas into a gaseous component and a water component is disposed downstream of the cooler 24.

The modifier 12 includes an air supply mechanism 28 having an air compressor 30 which is connected to a modifying-air supply passage 32, a combusting-air supply passage 34, and an off-gas discharging air supply passage 36. The modifying-air supply passage 32 is connected to the evaporator 18. The combusting-air supply passage 34 is connected to the combustor 20. The off-gas discharging air supply passage 36 is connected to the combustor 20 through a PSA mechanism 42 described later. The modifying-air supply passage 32, the combusting-air supply passage 34, and the off-gas discharging air supply passage 36 can be connected to the air compressor 30 respectively through valves 38a, 38b, 38c.

The PSA mechanism 42 of the refiner 14 is disposed downstream of and connected to the gas-liquid separator 26 through a modified gas supply passage 40. The PSA mechanism 42 is supplied with a modified gas from which water is separated by the gas-liquid separator 26. A compressor 48 is connected to the modified gas supply passage 40 for delivering the modified gas under pressure to the PSA mechanism 42.

Figure 2:
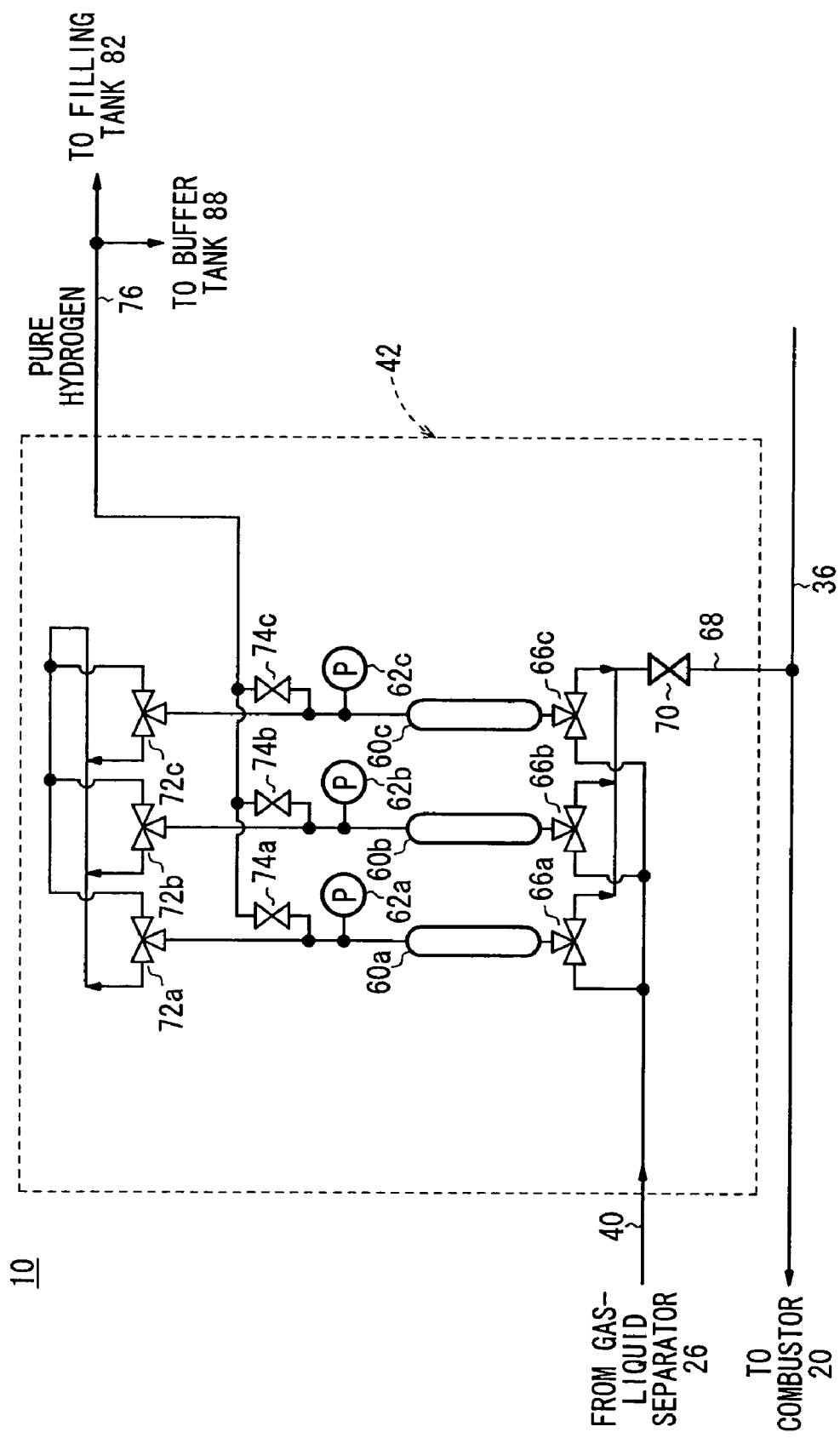
FIG. 2 is a block diagram of a PSA mechanism in the home fuel gas refining system shown in FIG. 1.

As shown in FIG. 2, the PSA mechanism 42 comprises a three-tower swing adsorption device, for example, and has three adsorption towers 60a, 60b, 60c that can individually be connected to the compressor 48. The adsorption towers 60a, 60b, 60c are associated with respective pressure meters 62a, 62b, 62c for detecting the pressures in the adsorption towers 60a, 60b, 60c. The adsorption towers 60a, 60b, 60c have inlet/outlet ends (lower ends) connected to respective valves 66a, 66b, 66c that are connected to an off-gas discharge passage 68. The off-gas discharge passage 68 has a valve 70 and is connected to the off-gas discharging air supply passage 36.

The adsorption towers 60a, 60b, 60c have other inlet/outlet ends (upper ends) connected to respective pressure-uniformizing valves 72a, 72b, 72c and also to respective combustion gas discharging valves 74a, 74b, 74c. The adsorption towers 60a, 60b, 60c can be connected to a fuel gas passage 76 by the combustion gas discharging valves 74a, 74b, 74c. As shown in FIG. 1, the fuel gas passage 76 has an end connected through a valve 80 to a filling tank 82 of the storage assembly 16. The fuel gas passage 76 is branched into a fuel gas branch passage 84 connected to a buffer tank 88 by a valve 86 of the storage assembly 16.

The filling tank 82 supplies a fuel gas stored therein to a fuel cell vehicle (not shown). The buffer tank 88 supplies a fuel gas stored therein to a stationary fuel cell (not shown) installed in households for generating electric energy.

The home fuel gas refining system 10 has a control ECU (Electronic Control unit) 90 as a controller for communicating with various accessory units and controlling various components of the home fuel gas refining system 10, and, especially in the present embodiment, for determining whether the PSA mechanism 42 is in a prescribed shutoff state when supplied with a shutoff signal and also for continuously operating the PSA mechanism 42 until the PSA mechanism 42 is brought into the prescribed shutoff state.

Operation of the home fuel gas refining system 10 thus constructed will be described below with respect to a shutoff method according to present invention.

In the home fuel gas refining system 10, the air compressor 30 is operated by the control ECU 90 to deliver modifying air, combusting air, and off-gas discharging air respectively to the modifying-air supply passage 32, the combusting-air supply passage 34, and the off-gas discharging air supply passage 36.

The modifying air that is delivered to the modifying-air supply passage 32 is supplied to the evaporator 18, which is also supplied with a modification fuel such as a natural gas, a city gas, or the like and water. The combustor 20 is supplied with the combusting air, an off gas, and, if necessary, hydrogen, and a burning process is carried out, enabling the evaporator 18 to evaporate the modification fuel and water.

The evaporated modification fuel is sent from the evaporator 18 to the reactor 22. The reactor 22 simultaneously performs an oxidizing reaction represented by $CH_4 + 2O_2 \rightarrow CO_2 + 2H_2O$ (exothermic reaction) and a fuel modifying reaction represented by $CH_4 + 2H_2O \rightarrow CO_2 + 4H_2$ (endothermic reaction) on methane, for example, in the modification fuel, oxygen in the air, and water vapor (automatic thermal process).

The modified gas that is produced by the reactor 22 is cooled by the cooler 24 and then supplied to the gas-liquid separator 26, which separates water from the modified gas. The modified gas is then sent from the gas-liquid separator 26 to the modified gas supply passage 40. The modified gas is compressed by the compressor 48 and selectively supplied to the adsorption towers 60a, 60b, 60c of the PSA mechanism 42 (see FIG. 2).

Figure 3:
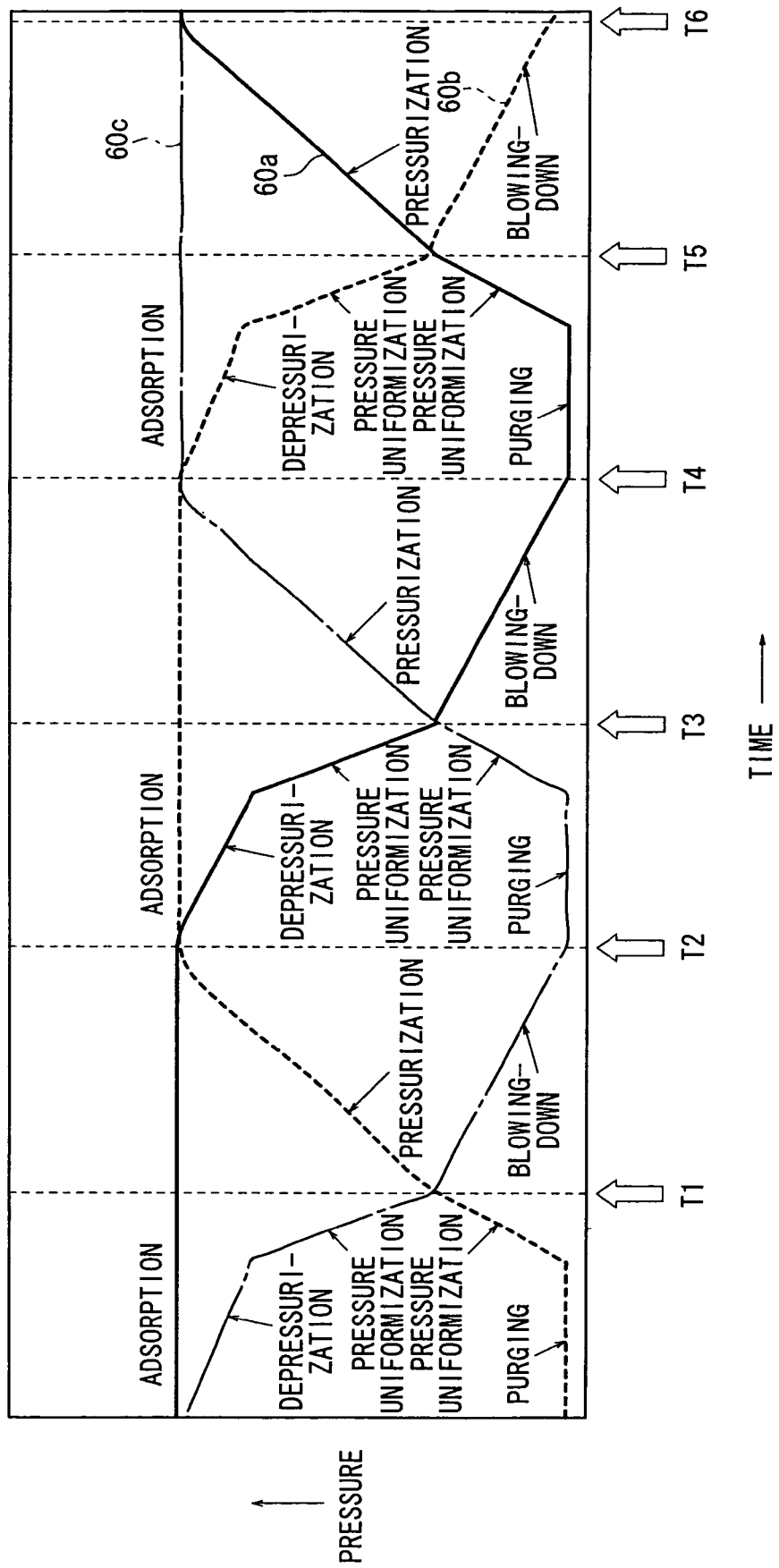
FIG. 3 is a timing chart illustrative of the manner in which the PSA mechanism operates.

As shown in FIG. 3, the adsorption tower 60a performs an adsorption process, the adsorption tower 60b performs a purging process, and the adsorption tower 60c performs a depressurization process, for example, simultaneously. Specifically, the adsorption tower 60a adsorbs components other than hydrogen of the modified gas, thus producing a fuel gas containing high-concentration hydrogen (hydrogen-rich). The valve 74a is then opened to supply the fuel gas from the adsorption tower 60a to the fuel gas passage 76 (see FIG. 2). The fuel gas is then selectively stored in the filling tank 82 and the buffer tank 88 as shown in FIG. 1.

Then, as shown in FIG. 3, the adsorption tower 60a performs an adsorption process, the adsorption tower 60b performs a pressure uniformization process, and the adsorption tower 60c performs a pressure uniformization process. Thereafter, the adsorption tower 60a performs an adsorption process, the adsorption tower 60b performs a pressurization process, and the adsorption tower 60c performs a blowing-down process. When the valve 66c is opened, an off gas (unwanted materials or residual gas) produced by the blowing-down process in the adsorption tower 60c is discharged into the off-gas discharge passage 68. The adsorption tower 60c then performs a purging process.

As shown in FIG. 1, the off-gas discharge passage 68 is connected to the off-gas discharging air supply passage 36. The off gas that is discharged into the off-gas discharge passage 68 is delivered to the combustor 20 by the off-gas discharging air that flows through the off-gas discharging air supply passage 36. The off gas is used as a combustion fuel by the combustor 20.

The adsorption towers 60a, 60b, 60c thus successively perform the adsorption, depressurization, pressure uniformization, blowing-down (desorption), and purging processes to enable the PSA mechanism 42 to refine the fuel gas continuously. The fuel gas is supplied from the fuel gas passage 76 to the storage assembly 16 when the valves 74a, 74b, 74c are selectively opened and closed.

Normal shutoff positions (prescribed shutoff states) are preset for the PSA mechanism 42. For example, as shown in FIG. 3, the adsorption towers 60a, 60b, 60c are required to be shut off at operative positions T1, T2, T3, T4, T5, T6.

The operative position T1 is an operative position after the adsorption towers 60b, 60c have finished the pressure uniformization process and immediately before the adsorption tower 60c enters the desorption process. Similarly, the operative position T3 is an operative position after the adsorption towers 60a, 60c have finished the pressure uniformization process and immediately before the adsorption tower 60a enters the desorption process. The operative position T5 is an operative position after the adsorption towers 60a, 60b have finished the pressure uniformization process and immediately before the adsorption tower 60b enters the desorption process.

The operative position T2 is a final operative position when the adsorption towers 60a, 60b, 60c have performed the adsorption, pressurization, desorption processes, respectively, and when the adsorption tower 60c is under a substantially atmospheric pressure (purging process). Similarly, the operative position T4 is a final operative position when the adsorption towers 60a, 60b, 60c have performed the desorption, adsorption, and pressurization processes, respectively, and when the adsorption tower 60a is under a substantially atmospheric pressure (purging process), and the operative position T6 is a final operative position when the adsorption towers 60a, 60b, 60c have performed the pressurization, desorption, and adsorption processes, respectively, and when the adsorption tower 60b is under a substantially atmospheric pressure (purging process).

Figure 4:
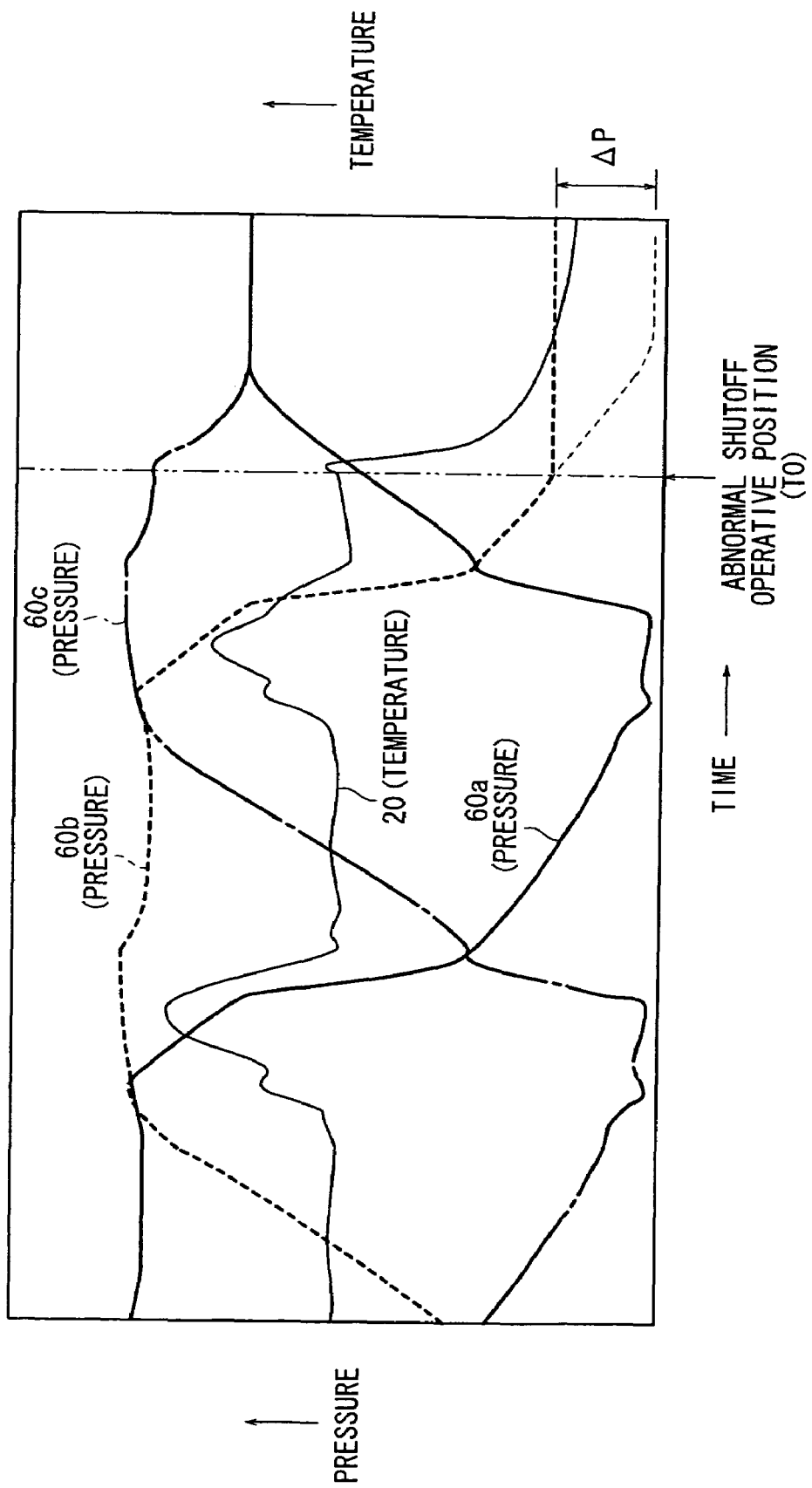
FIG. 4 is a diagram illustrative of temperatures and pressures when the PSA mechanism is shut off abnormally.

Since the home fuel gas refining system 10 operates depending on the demand of households, the home fuel gas refining system 10 is repeatedly activated and shut off and does not operate during constant periods of time and is not shut off at constant times. Furthermore, the home fuel gas refining system 10 may be shut off abnormally for some reasons while it is being in operation. Specifically, the adsorption towers 60a, 60b, 60c may be shut off at operative positions other than the operative positions T1 through T6. For example, if the home fuel gas refining system 10 is shut off in emergency at an abnormal shutoff operative position T0 shown in FIG. 4, then the adsorption tower 60b is in the blowing-down process, with an excessive pressure $\Delta P$ remaining between the blowing-down process and the purging process (atmospheric pressure).

Figure 5:
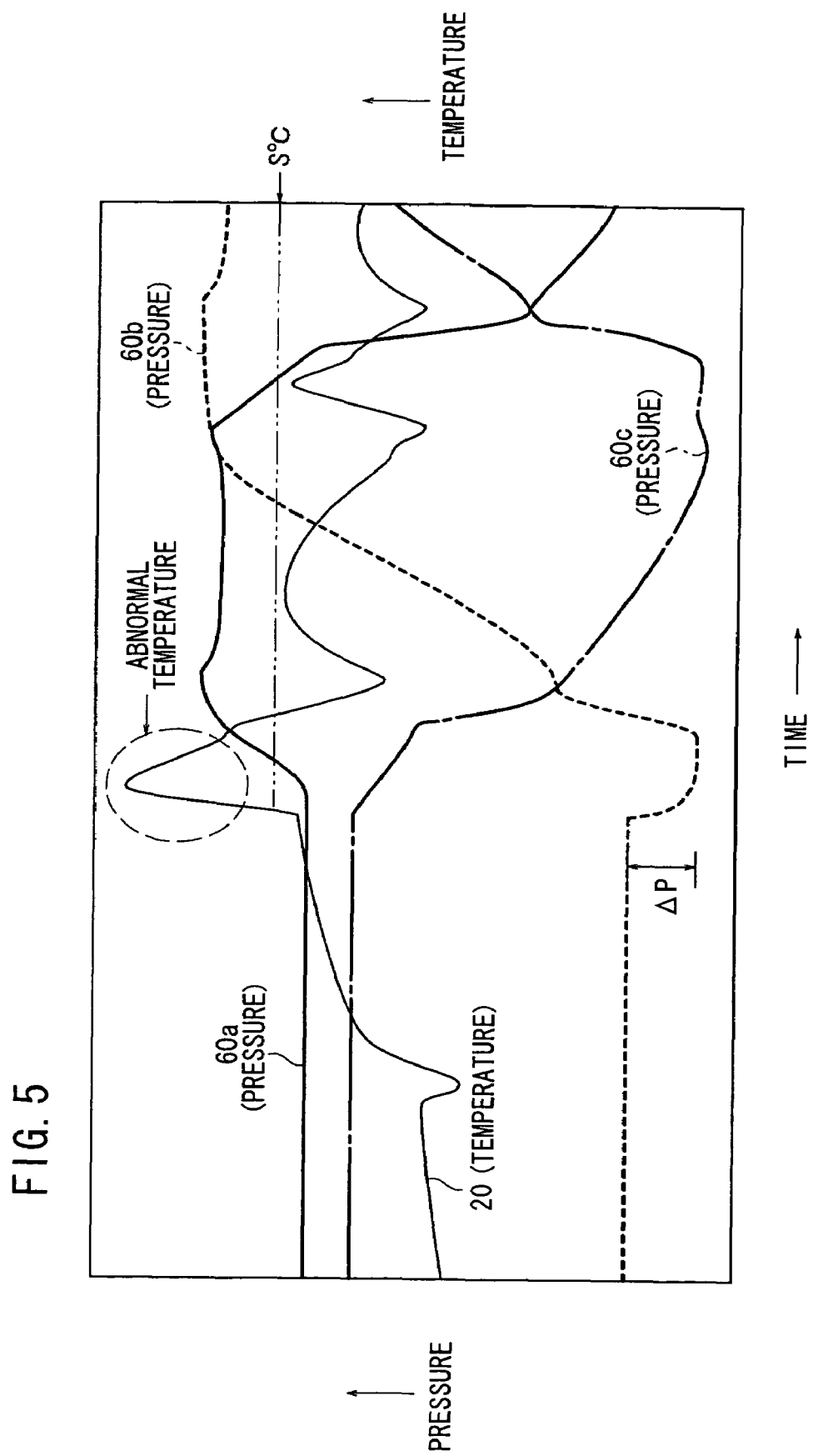
FIG. 5 is a diagram illustrative of temperatures and pressures when the PSA mechanism starts to operate after it is shut off abnormally.

If the home fuel gas refining system 10 starts operating from the abnormal shutoff operative position T0, then as shown in FIG. 5, the off gas in the adsorption tower 60b is excessively supplied to the combustor 20 under the excessive pressure $\Delta P$ in the adsorption tower 60b, causing the combustor 20 to exceed an abnormal temperature S° C.

According to the present embodiment, the following process is carried out before the home fuel gas refining system 10 is shut off.

Figure 6:
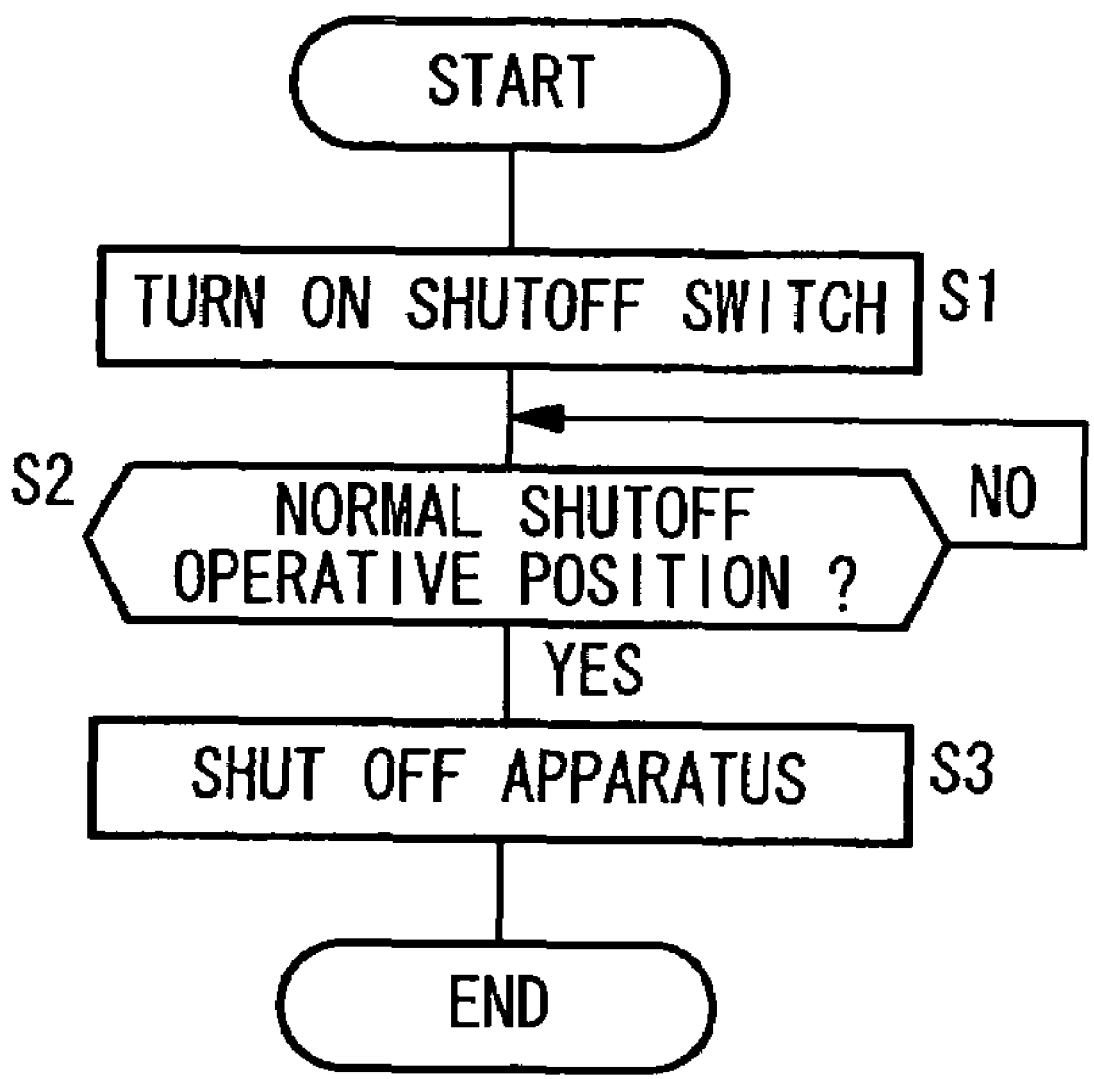
FIG. 6 is a flowchart of a process of shutting off the PSA mechanism normally.

As shown in FIG. 6, when an unillustrated shutoff switch is turned on while the home fuel gas refining system 10 is in operation in step S1, the control ECU 90 determines whether the PSA mechanism 42 is in a proper shutoff operative position, i.e., in a prescribed shutoff state, or not in step S2.

Specifically, the pressure meters 62a, 62b, 62c detect respective internal pressures of the adsorption towers 60a, 60b, 60c of the PSA mechanism 42. The control ECU 90 judges actual shutoff operative positions of the adsorption towers 60a, 60b, 60c based on the detected internal pressures. If the PSA mechanism 42 is not in the prescribed shutoff state (NO in step S2), then the home fuel gas refining system 10 is kept in continuous operation until the PSA mechanism 42 is brought into the prescribed shutoff state.

Specifically, as shown in FIG. 3, the operation of the home fuel gas refining system 10 is continued until the adsorption towers 60a, 60b, 60c reach any one of the operative positions T1 through T6. If the home fuel gas refining system 10 is judged as having reached a proper shutoff operative position (YES in step S2), then control goes to step S3 to shut off the home fuel gas refining system 10.

According to the present embodiment, when a shutoff signal is entered to shut off the home fuel gas refining system 10, the home fuel gas refining system 10 is not immediately shut off, but continuously operated until the PSA mechanism 42 is brought into the prescribed shutoff state.

Therefore, the PSA mechanism 42 is always controlled so as to be brought into the prescribed shutoff state. When the home fuel gas refining system 10 starts to operate again, therefore, it can reliably and quickly start operating without damage to the combustor 20.

Whether the PSA mechanism 42 is in the prescribed shutoff state or not may be determined simply by determining whether any one of the adsorption towers 60a, 60b, 60c is under a substantially atmospheric pressure (in one of the operative positions T2, T4, T6) or not, i.e., whether any one of the adsorption towers 60a, 60b, 60c is in the purging process or not, or whether any one of the adsorption towers 60a, 60b, 60c is in an operative position (one of the operative positions T1, T3, T5) immediately prior to the desorption process or not.

In this manner, the off gas can be maintained in a normal calorific range according to a very simple control process. Furthermore, since any off-gas tank may be dispensed with or may be reduced in size, the home fuel gas refining system 10 may easily be reduced in size.

Figure 7:
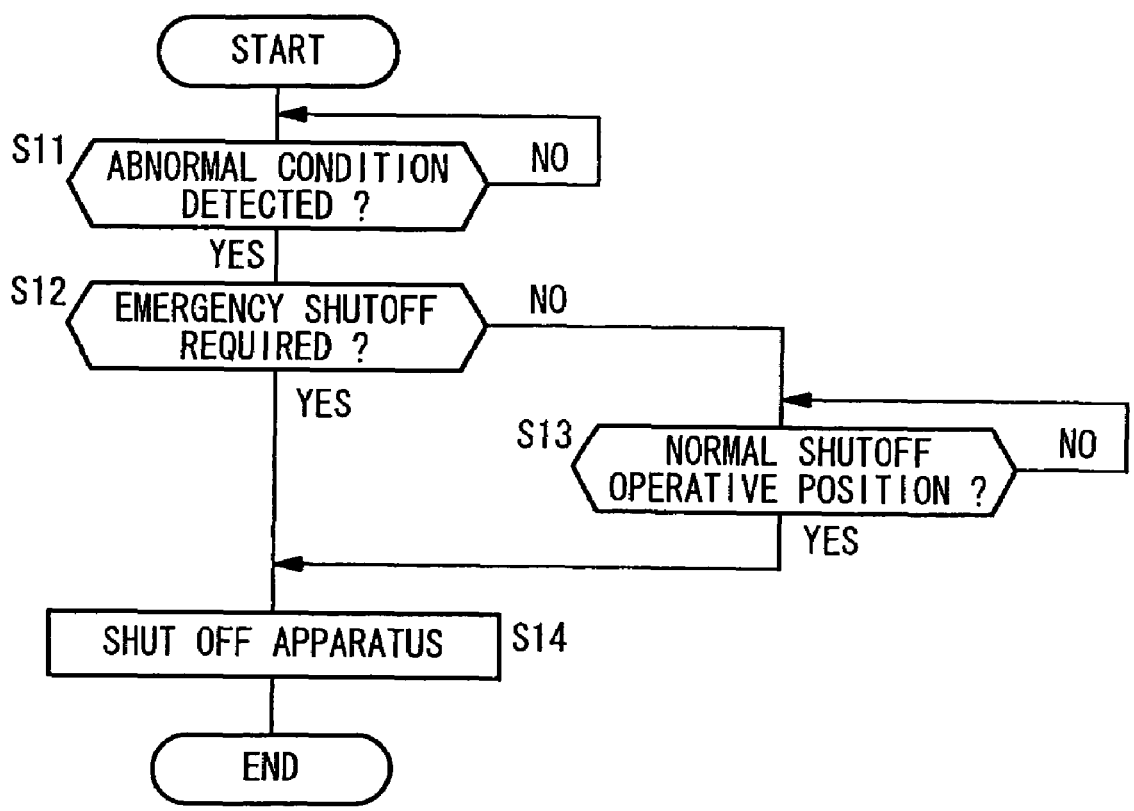
FIG. 7 is a flowchart of a process of shutting off the PSA mechanism abnormally.
Figure 8:
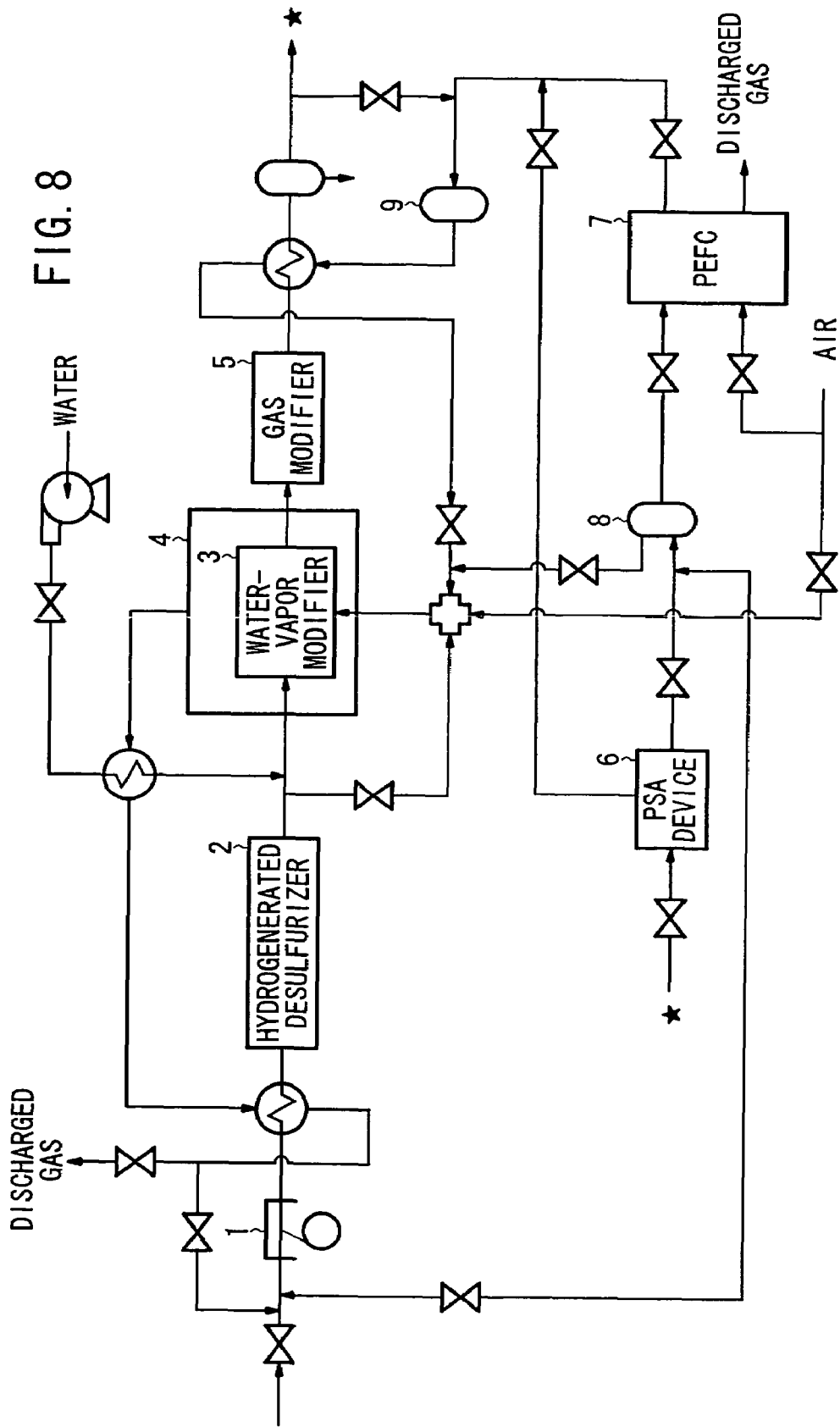
FIG. 8 is a block diagram of a conventional fuel gas manufacturing apparatus.

A process to be carried out for emergency shutoff of the home fuel gas refining system 10 will be described below with reference to FIG. 7.

When an abnormal condition is detected while the home fuel gas refining system 10 is in operation (YES in step S11), then control goes to step S12 to determine whether the home fuel gas refining system 10 is required to be shut off in emergency by the abnormal condition or not. If the home fuel gas refining system 10 is not required to be shut off in emergency, then control goes to step S13 to determine whether the PSA mechanism 42 is in a proper shutoff operative position or not. The home fuel gas refining system 10 is continuously operated until the PSA mechanism 42 is brought into the proper shutoff operative position (YES in step S13). After the PSA mechanism 42 is brought into the proper shutoff operative position, the home fuel gas refining system 10 is shut off in step S14.

If the home fuel gas refining system 10 is required to be shut off in emergency (YES in step S12), then the home fuel gas refining system 10 is immediately shut off in step S14.

As described above, even when an abnormal condition is detected while the home fuel gas refining system 10 is in operation, the home fuel gas refining system 10 is continuously operated until the PSA mechanism 42 is brought into the proper shutoff operative position unless the home fuel gas refining system 10 is required to be shut off in emergency. Therefore, the home fuel gas refining system 10 can start reliably and quickly to operate again.

In the illustrated embodiment, the PSA mechanism 42 is of a three-tower structure having the adsorption towers 60a, 60b, 60c. However, the principles of the present invention are also applicable to PSA mechanisms of other designs, e.g., a PSA mechanism having four adsorption towers.

Although a certain preferred embodiment of the present invention has been shown and described in detail, it should be understood that various changes and modifications may be made therein without departing from the scope of the appended claims.

What is claimed is:

1. A method of shutting off a fuel gas manufacturing apparatus for manufacturing a hydrogen-rich fuel gas by modifying a hydrogen-containing fuel into a modified gas, supplying the modified gas to a PSA mechanism, and removing unwanted materials from the modified gas to produce a hydrogen-rich fuel gas, comprising the steps of:
   determining whether said PSA mechanism is in a prescribed shutoff state or not when a shutoff signal is entered to shut off said fuel gas manufacturing apparatus;
   if said PSA mechanism is judged as not being in said prescribed shutoff state, continuously operating said fuel gas manufacturing apparatus until said PSA mechanism is brought into said prescribed shutoff state; and
   if said PSA mechanism reaches said prescribed shutoff state, shutting off said fuel gas manufacturing apparatus.

2. A method according to claim 1, wherein said PSA mechanism reaches said prescribed shutoff state when the pressure in any one of towers of said PSA mechanism is a substantially atmospheric pressure.

3. A method according to claim 1, wherein said PSA mechanism reaches said prescribed shutoff state when any one of towers of said PSA mechanism is in an operative position immediately prior to a desorption process.

4. A method of shutting off a fuel gas manufacturing apparatus for manufacturing a hydrogen-rich fuel gas by modifying a hydrogen-containing fuel into a modified gas, supplying the modified gas to a PSA mechanism, and removing unwanted materials from the modified gas to produce a hydrogen-rich fuel gas, comprising the steps of:
   determining whether said fuel gas manufacturing apparatus is required to be shut off in an emergency by an abnormal condition or not when said abnormal condition is detected while said fuel gas manufacturing apparatus is in operation;
   if said fuel gas manufacturing apparatus is judged as not being required to be shut off in emergency, continuously operating said fuel gas manufacturing apparatus until said PSA mechanism is brought into a prescribed shutoff state; and
   if said fuel gas manufacturing apparatus is judged as being required to be shut off in emergency, immediately shutting off said fuel gas manufacturing apparatus.

5. A method according to claim 4, wherein said PSA mechanism reaches said prescribed shutoff state when the pressure in any one of towers of said PSA mechanism is a substantially atmospheric pressure.

6. A method according to claim 4, wherein said PSA mechanism reaches said prescribed shutoff state when any one of towers of said PSA mechanism is in an operative position immediately prior to a desorption process.

* * * * *